US012656306B2

(12) United States Patent
Alam et al.

(10) Patent No.: US 12,656,306 B2
(45) Date of Patent: Jun. 16, 2026

(54) SYSTEM AND METHOD FOR SELF-CALIBRATING OF ION SELECTIVE ELECTRODES BASED ON DIFFERENTIAL VOLTAGE MEASUREMENT

(71) Applicant: Purdue Research Foundation, West Lafayette, IN (US)

(72) Inventors: Muhammad A. Alam, West Lafayette, IN (US); Ajanta Saha, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 175 days.

(21) Appl. No.: 18/396,969

(22) Filed: Dec. 27, 2023

(65) Prior Publication Data

US 2024/0219344 A1 Jul. 4, 2024

Related U.S. Application Data

(60) Provisional application No. 63/435,804, filed on Dec. 29, 2022.

(51) Int. Cl.
*G01N 27/416* (2006.01)
*G01N 27/333* (2006.01)

(52) U.S. Cl.
CPC ....... *G01N 27/4163* (2013.01); *G01N 27/333* (2013.01); *G01N 27/4165* (2013.01)

(58) Field of Classification Search
CPC ............. G01N 27/4163; G01N 27/333; G01N 27/4165
See application file for complete search history.

(56) References Cited

U.S. PATENT DOCUMENTS

| 7,189,314 B1 * | 3/2007 | Pace | G01N 33/1886 |
| | | | 204/412 |
| 8,137,520 B1 * | 3/2012 | Cheng | G01N 27/333 |
| | | | 204/418 |

(Continued)

OTHER PUBLICATIONS

Lin et al., Study of sodium ion selective electrodes and differential structures with anodized indium tin oxide, Sensors, 2010, 10, 1798-1809 (Year: 2010).*

(Continued)

*Primary Examiner* — Shizhi Qian
(74) *Attorney, Agent, or Firm* — Piroozi-IP, LLC

(57) ABSTRACT

A method of temperature self-calibrating ion-selective electrodes (ISEs) is disclosed which includes calibrating at least two ISEs against a reference electrode (RE) in a calibration solution with a predetermined concentration as the temperature of the calibration solution varies according to a known schedule, wherein the calibration of the at least two ISEs includes determining calibration parameters of each of the at least two ISEs with respect to the RE, placing the at least two calibrated ISEs and the RE into a field solution for determining one or more field parameters of the field solution, measuring voltage across a first of the at least two calibrated ISEs and the RE ($V_i$), measuring voltage across a second of the at least two calibrated ISEs and the RE ($V_{i+1}$), determining $V_i$–$V_{i+1}$, and determining the one or more field parameters.

11 Claims, 14 Drawing Sheets

(56)                References Cited

U.S. PATENT DOCUMENTS

| | | | |
|---|---|---|---|
| 2018/0246055 A1* | 8/2018 | Naidu | G01N 27/333 |
| 2019/0302087 A1* | 10/2019 | Kahn | G01N 27/3335 |
| 2020/0116664 A1* | 4/2020 | Abeyrathne | G01N 27/301 |
| 2022/0162090 A1* | 5/2022 | Ly | G06Q 10/06395 |

OTHER PUBLICATIONS

Brand et al., Differential potentiometry with ion-selective electrodes: a new instrumental approach, Analytical Chemistry, 1970, 42, 616-622 (Year: 1970).*

Goff et al., An accurate and stable nitrate-selective electrode for the in situ determination of nitrate in agricultural drainage waters, Analyst, 2002, 127, 507-511 (Year: 2002).*

Shiwaku et al., A printed organic amplification system for wearable potentiometric electrochemical sensors, Scientific Reports, 2018, 8, 3922 (Year: 2018).*

Zuther et al., Temperature Compensation for a Nitrate Sensor; vol. 3., Sensors and Actuators, 1994.

Smith et al., Reference Electrodes; 2007, Handbook of Electrochemistry.

Han et al., An Overview of the Development of Flexible Sensors. Advanced Materials. Wiley-VCH Verlag Sep. 6, 2017.

Jin et al., Steady-State and Transient Performance of Ion-Sensitive Electrodes Suitable for Wearable and Implantable Electro-Chemical Sensing. IEEE Transactions on Biomedical Engineering 2022, 69 (1), 96-107.

USEPA, Method 353.2, Revision 2.0: Determination of Nitrate-Nitrite Nitrogen by Automated Colorimetry; 1993.

Amemiya, Potentiometric Ion-Selective Electrodes; 2007.

Zdrachek et al., E.; Bakker, E. Potentiometric Sensing. Analytical Chemistry. American Chemical Society Jan. 12, 2021, pp. 72-102.

Sailapu et al., Self-Powered Potentiometric Sensors with Memory. ACS Sensors 2021, 6 (10), 3650-3656.

Shao et al., J. Recent Advances in Solid-Contact Ion-Selective Electrodes: Functional Materials, Transduction Mechanisms, and Development Trends. Chemical Society Reviews. Royal Society of Chemistry Jul. 7, 2020, pp. 4405-4465.

Song et al., Wireless Battery-Free Wearable Sweat Sensor Powered by Human Motion; 2020; vol. 6.

Sethuramasamyraja et al., Analysis of an Ion-Selective Electrode Based Methodology for Integrated on-the-Go Maping of Soil,PH, Potassium, and Nitrate Contents, 50 (6), 1927-1935, 2007.

Nakata et al., Wearable, Flexible, and Multifunctional Healthcare Device with an ISFET Chemical Sensor for Simultaneous Sweat PH and Skin Temperature Monitoring. ACS Sensors 2017, 2 (3), 443-448.

Le Goff et al., An Accurate and Stable Nitrate-Selective Electrode for the in Situ Determination of Nitrate in Agricultural Drainage Waters. Analyst 2002, 127 (4), 507-511. (9) Cheng et al., On Calibration of PH Meters. Sensors 2005, 5, 209-219.

Cheng et al., On Calibration of PH Meters. Sensors 2005, 5, 209-219.

Ma et al., A Systematic Study on Self-Powered Microbial Fuel Cell Based BOD Biosensors Running under Different Temperatures. Biochemical Engineering Journal 2022, 180, 108372.

Guilini et al., Response of Posidonia Oceanica Seagrass and Its Epibiont Communities to Ocean Acidification. PLoS One 2017, 12 (8).

Xuan et al., Lactate Biosensing for Reliable On-Body Sweat Analysis. ACS Sensors 2021, 6 (7), 2763-2771.

Ghoreishi et al., A Novel Naphazoline-Selective Membrane Sensor and Its Pharmaceutical Applications. Sensors and Actuators, B: Chemical 2006, 113 (2), 963-969.

Cieslewski et al., Development of a Wireline Tool Containing an Electrochemical Sensor for Real-Time PH and Tracer Concentration Measurement; 2016; vol. 40.

Ansuini et al., Factors Affecting the Accuracy of Reference Electrodes; 1994; vol. 33.

Jin et al., Open-Source Low-Cost Wireless Potentiometric Instrument for PH Determination Experiments. Journal of Chemical Education 2018, 95 (2), 326-330.

Gao et al., Fully Integrated Wearable Sensor Arrays for Multiplexed in Situ Perspiration Analysis. Nature 2016, 529 (7587), 509-514.

Zdrachek et al., Solid-Contact Potentiometric Cell with Symmetry. Analytical Chemistry 2022, 94 (2), 612-617.

Bard et al., Potentials and Thermodynamics of Cells. In Electrochemical Methods Fundamentals and Applications; pp. 44-85, 2022.

* cited by examiner

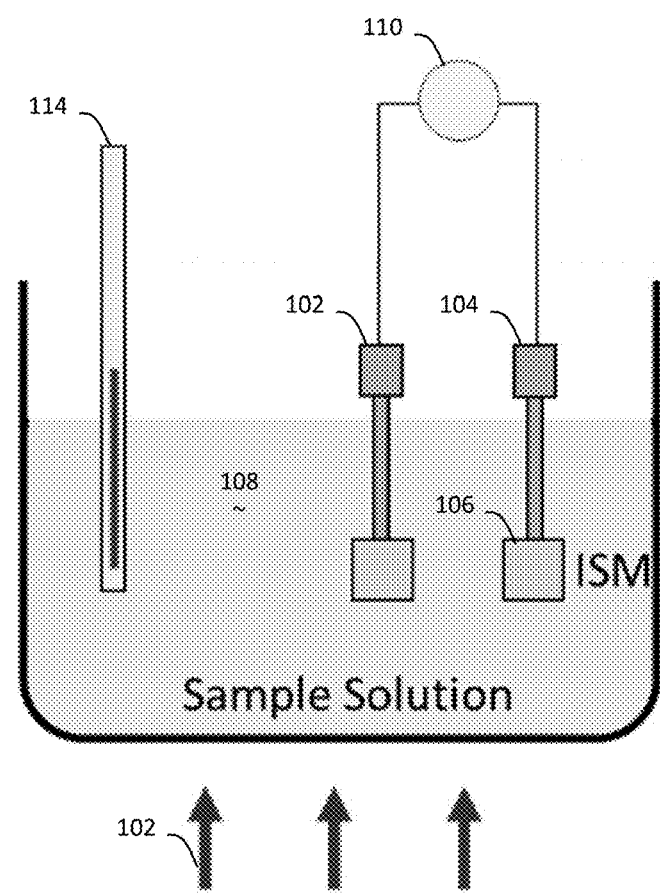
FIG. 1a

Nitrate ISEs printed by a R2R process

Nitrate sensors

Zdrachek et al.[19]

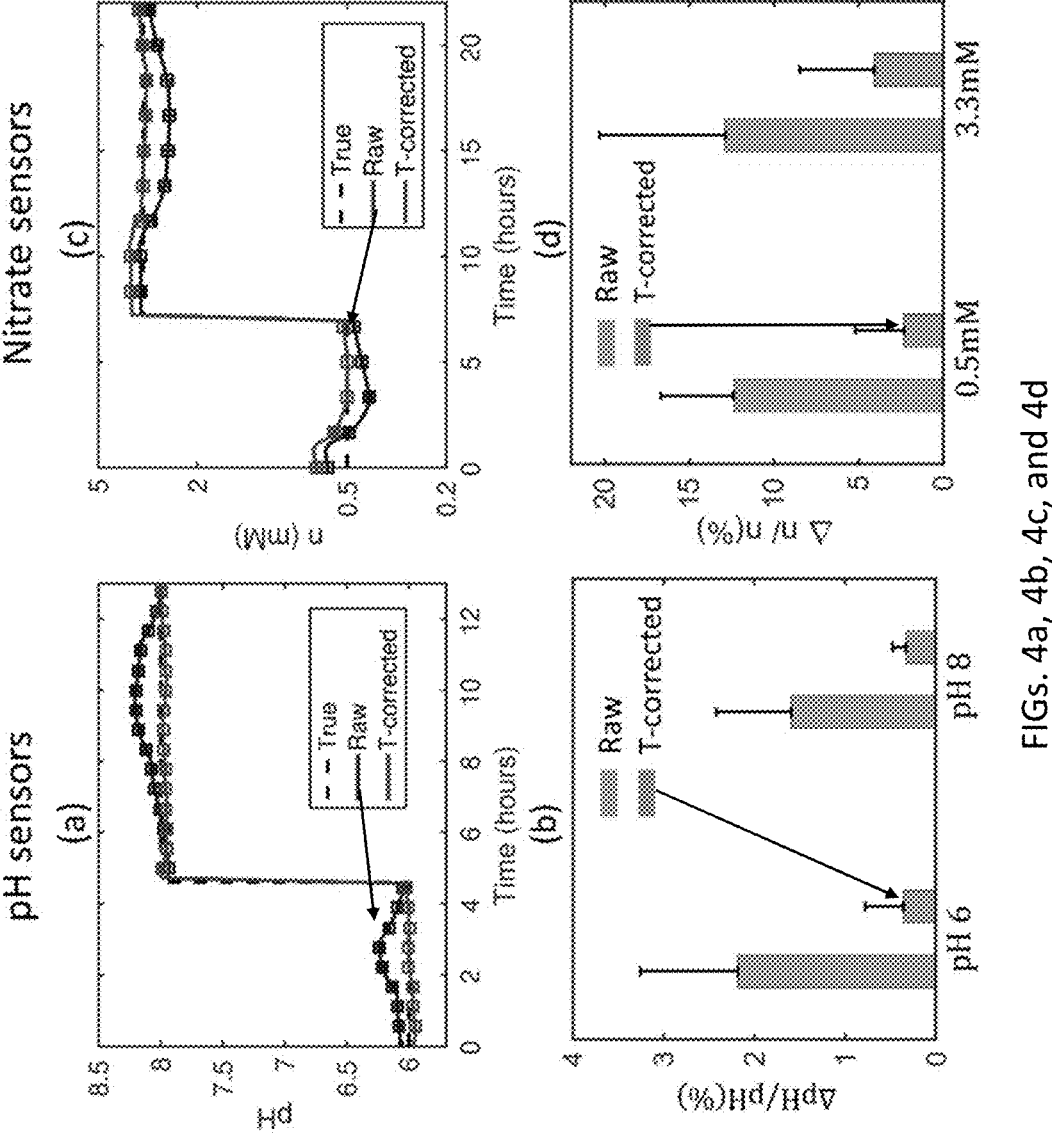
FIGs. 4a, 4b, 4c, and 4d

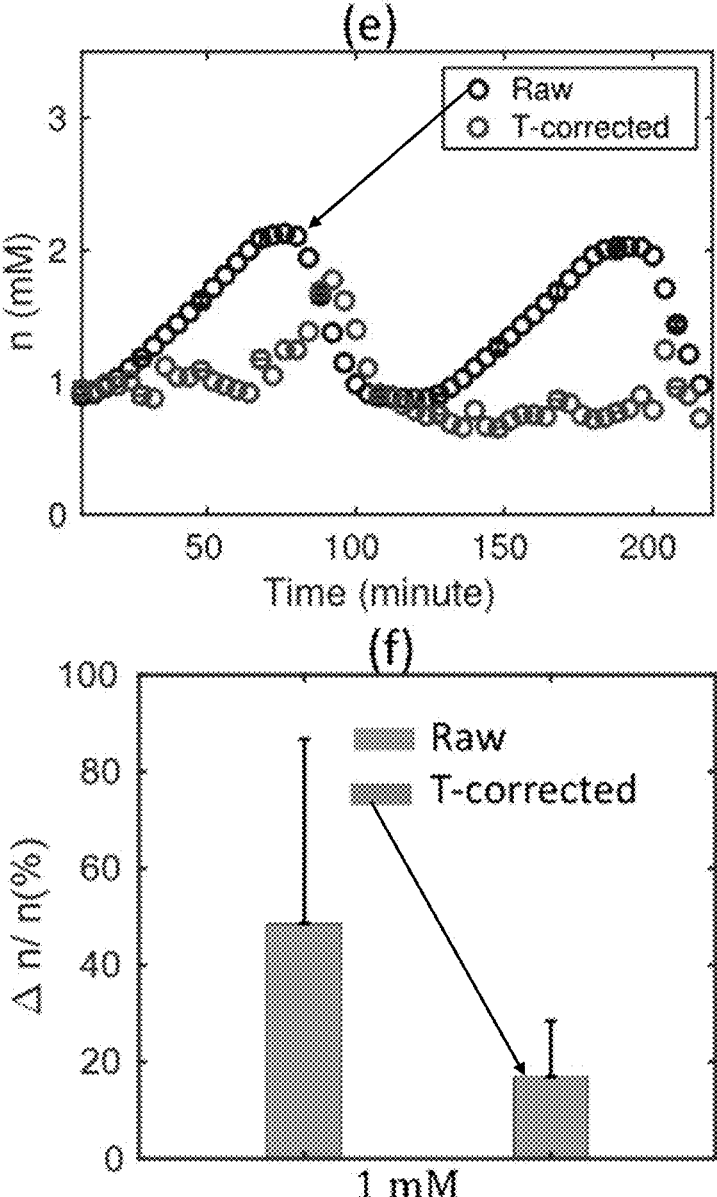
FIGs. 4e, and 4f

SYSTEM AND METHOD FOR SELF-CALIBRATING OF ION SELECTIVE ELECTRODES BASED ON DIFFERENTIAL VOLTAGE MEASUREMENT

CROSS-REFERENCE TO RELATED APPLICATIONS

This patent application claims priority to a U.S. provisional patent application Ser. 63/435,804 filed Dec. 29, 2022, contents of which are incorporated by reference in its entirety into the present disclosure.

STATEMENT REGARDING GOVERNMENT FUNDING

None.

TECHNICAL FIELD

The present disclosure generally relates to ion-selective electrodes and in particular to a system and method for self-calibrating such ion-selective electrodes based on ambient variations.

BACKGROUND

This section introduces aspects that may help facilitate a better understanding of the disclosure. Accordingly, these statements are to be read in this light and are not to be understood as admissions about what is or is not prior art.

Ion-selective electrode (ISE) systems have been widely used in clinical or laboratory fields, inter alia, due to high selectivity, ultralow detection limit, and a broad dynamic range of these types of electrodes. Specifically, solid-contact (SC) ISE's small footprint, flexible substrate, and battery-free operation make these electrodes an excellent candidate for Point of Care (POC), wearable, and implantable applications. However, in the presence of varying ambient conditions, ISEs require repetitive calibrations. In particular, unlike in the controlled laboratory setting, the operating conditions in the field fluctuate constantly and over a broad range. Since the performance of ISE is highly sensitive to environmental conditions and calibration parameters, it has been difficult to measure analyte concentration by POC, wearable, and implantable sensors with accuracy comparable to the laboratory conditions.

To be specific, a potentiometric ISE converts target ionic activity into a measurable voltage based on a well-known Nernst principle. To obtain analyte concentration from measured voltage, sensors must be first calibrated. In the traditional calibration method, a voltage-to-concentration conversion function is obtained by measuring the voltage at multiple standard solutions each with a predetermined concentration at a fixed temperature. This conversion function is later used to calculate the unknown target concentration from the measured voltage. In the laboratory setting, the operating range of temperature is restricted as close as possible to the original calibration temperature to limit measurement error due to temperature variation. However, the operating temperature cannot be controlled when ISEs are used for in-situ wastewater monitoring, soil and water nutrition quantification, sweat analysis, biological or chemical process monitoring, etc., in which local temperatures at the sensor site can vary substantially in time and can be very different from ambient temperature measured at a distance from the sensor. Fixed temperature approximation limits the accuracy of the measurement of ISEs with high temperature sensitivity which can be up to about 2-3 mV/° C. In other words, a 20° C. uncompensated variation would lead to an order-magnitude uncertainty in the analyte concentration, which can result in unacceptable outputs without calibration with temperature as a variable.

To address this shortcoming, others have approached calibration methodologies differently. For example, some have used an external thermometer to measure the temperature of the surrounding medium. However, it is often ignored that, temperature of the surrounding medium may differ from the self-temperature of ISE if thermal conductivity of the ISE and the surrounding medium is different or if there is any local heating related to embedded electronics for signal processing. This discrepancy can be critical where high accuracy is desired. Moreover, in miniaturized integrated sensors, a temperature-dependent resistor is usually utilized as the temperature sensor. This system requires an external power source for the thermometer that erases the advantage of an ultra-low power operation of ISEs. Frequent replacement of the battery makes maintenance of the system difficult and expensive. Additionally, any crosstalk between electrical signal of the temperature sensor and ISE may further reduce the accuracy.

Yet another source of error in POC, wearable, and implantable ISEs is the lack of frequent calibration. The values of calibration parameters change during the operation and so ISEs are frequently calibrated during laboratory usage to ensure precise measurement. But traditional calibration method requires standard solutions of different concentrations to calibrate sensors which makes it difficult to calibrate in the POC, wearable, and implantable sensors applications frequently in operating conditions as needed to maintain accurate parameters.

Therefore, there is an unmet need for a novel system and method for calibrating of ion-selective electrodes that can be used repetitively without the use of a separate temperature sensing arrangement and the associated supporting circuitry.

SUMMARY

A method of temperature self-calibrating ion-selective electrodes (ISEs) for determining one or more field parameters is disclosed. The method includes calibrating at least two ISEs against a reference electrode (RE) in a calibration solution with a predetermined concentration as the temperature of the calibration solution varies according to a known schedule. The calibration of the at least two ISEs includes determining calibration parameters of each of the at least two ISEs with respect to the RE. The method further includes placing the at least two calibrated ISEs and the RE into a field solution for determining one or more field parameters of the field solution, measuring voltage across a first of the at least two calibrated ISEs and the RE ($V_i$), measuring voltage across a second of the at least two calibrated ISEs and the RE ($V_{i+1}$), determining $V_i-V_{i+1}$, and determining the one or more field parameters.

A system of temperature self-calibrating ion-selective electrodes (ISEs) for determining one or more field parameters is also disclosed. The system includes at least two ISEs and a reference electrode (RE), an electronic buffer coupled to each of the at least two calibrated ISEs and adapted to generate a voltage associated with each of the at least two calibrated ISEs, an electronic amplifier coupled to the RE and adapted to generate a voltage associated with the RE, an analog to digital converter (ADC) coupled to each of the electronic buffers and amplifier and configured to convert analog signals to digital signals, and a processing unit coupled to the ADC and configured to receive digital signals from the ADC. The processing unit is further configured to calibrate the at least two ISEs and the RE, wherein the calibration includes placement of the at least two ISEs in a calibration solution with a predetermined concentration as the temperature of the calibration solution varies according to a known schedule, wherein the calibration of the at least two ISEs includes determining calibration parameters of each of the at least two ISEs with respect to the RE, determine one or more field parameters by placement of the at least two calibrated ISEs and the RE into a field solution, determine voltage across a first of the at least two calibrated ISEs and the RE ($V_i$), determine voltage across a second of the at least two calibrated ISEs and the RE ($V_{i+1}$), determine $V_i-V_{i+1}$, and determine the one or more field parameters.

BRIEF DESCRIPTION OF DRAWINGS

FIG. 1$b$ is a schematic of two working electrodes that are placed in a solution along with a reference electrode.

FIG. 1$c$ is a block diagram that outlines the steps of calibration and use of ion-selective electrodes (ISEs) in the field.

FIG. 1$d$ provides graphs which voltage and concentration vs. time in days of measured differential voltage ($V_1-V_2$), which as provided in Eq. 7, and which is proportional to temperature T.

FIG. 1$e$ is a photograph of a Roll-to-Roll printed nitrate ISE, pH ISE and reference electrodes.

FIGS. 3$d$, 3$e$, and 3$f$ provide graphs of voltage in mV (FIG. 3$d$), voltage difference in mV (FIG. 3$e$), and temperature in K (FIG. 3$f$) vs. time providing measured voltage of nitrate ISEs.

FIGS. 3$g$, 3$h$, and 3$i$ provide graphs of voltage in mV (FIG. 3$g$), voltage difference in mV (FIG. 3$h$), and temperature in K (FIG. 3$i$) vs. time providing measured voltage of nitrate ISEs in the prior art.

FIGS. 4$a$-4$f$ show the experimental results of self-temperature corrected concentration of pH and nitrate sensors in self-calibration method that is considered in our laboratory experiment and taken from reference (FIGS. 3$a$-3$i$).

FIG. 5$c$ is a graph of moles in mM vs. time in days for a temperature corrected nitrate concentration (T-corrected) of field water, using the calculated self-temperature in Eq. 5 provided below.

FIG. 5$d$ shows the error between calculated concentration (Raw, T-corrected) and interpolated true concentration in the histogram.

DETAILED DESCRIPTION

Figure 1B:
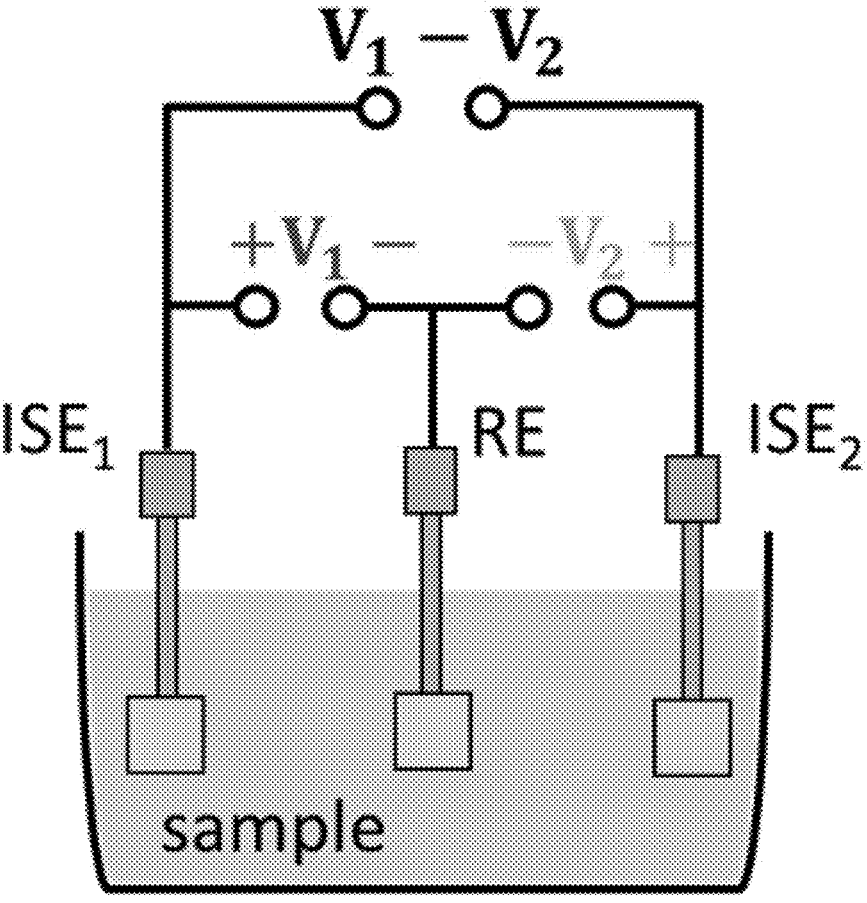
FIG. 1$a$ is a schematic of a laboratory setup using a reference electrode and a working electrode including an ion selective membrane (ISM) which includes a polymer that selectively allows certain ions in and keeps other ions out.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel system and method is disclosed herein for calibrating ion-selective electrodes (ISEs) that can be used repetitively without the use of a separate temperature sensing arrangement and the associated supporting circuitry. Towards this end, a novel self-calibration system and method is disclosed herein where an ISE sensor can serve as its own temperature sensing element, and thereby precisely measure the analyte concentration in varying field conditions by compensating for temperature variations. In other words, the ISEs become their own temperature-sensing units. This novel method and system was validated with controlled experiments using pH and nitrate ISEs which use Nernst principle for electrochemical sensing. We show that using self-calibration, pH and nitrate concentrations can be measured within 0.3% and 5% of the true concentration respectively under varying concentrations and temperature conditions. Moreover, we perform field study to continuously monitor the nitrate concentration of an agricultural field over a period of 6 days. The self-calibration approach determines the nitrate concentration within 4% of the ground-truth measured by laboratory-based high precision nitrate sensors. This novel approach is general and allows temperature-corrected analyte measurement for all Nernst-principle-based sensors being deployed as wearable or implantable sensors.

In order to better elucidate the operations of the novel method and system of the present disclosure, certain scientific principals related to ionic sensors are initially described. The sensitivity of potentiometric ISE to environmental condition and calibration parameters is given by the following Nernst equation:

$$E = \frac{k_B T}{zq}\ln(a) + E_0 = \frac{k_B T}{zq}\ln(\gamma_T n) + E_0 \qquad (1)$$

where E is the induced potential of working electrode,
$k_B$ is the Boltzmann's constant ($1.3807 \times 10$-23 joules per kelvin),
q is elementary charge ($1.60217663 \times 10$-19 coulombs),
T is operating temperature (in Kelvin),
z is charge number ($\pm 1, 2, \ldots$ depending on the solution),
a is ion activity,
n is concertation of target ion (moles per volume),
$\gamma_T$ is temperature dependent activity coefficient expressed as $\gamma_T = \gamma_{eff} f(T)$, where $\gamma_{eff}$ is a temperature independent term, and $f$ is a function of temperature (this functions for all practical purposes is 1 which as provided in Eq. 5 results in about 0 when ln (ft(T)) is determined), and $E_0$ is the standard potential of the working electrode. Had $E_0$ been a temperature-independent constant, the temperature sensitivity of the ISE potential would be restricted to about 0.086 mV/° C. and the temperature-induced error would be minimal. In practice, however, $E_0$ varies linearly with temperature as provided below:

$$E_0 = m'T + C \tag{2}$$

where we define m as, $$m \equiv \frac{k_B}{zq}\ln(\gamma_{eff}) + m'. \tag{}$$

Similarly, although the potential of the reference electrode does not depend on the analyte concentration, it is sensitive to local temperature, i.e., $$E_{ref} = m_{ref}T + C_{ref} \tag{4}$$

where $m_{ref}$, $C_{ref}$ are parameters associated with the reference electrode. Potential difference between working and reference electrode denoted as measured voltage can be obtained using Eq. 1-4 as provided below $$V = E - E_{ref} = \frac{k_B T}{zq}\ln(n) + T(m - m_{ref}) + (C - C_{ref}) + \frac{k_B T}{zq}\ln(f(T)) \tag{5}$$

As discussed above, the $$\frac{k_B T}{zq}\ln(f(T))$$

falls out as $f(T)$ is about 1, since ln(1) is 0.

Referring to FIG. 1a which is a schematic of a laboratory setup 100 using a reference electrode 102 and a working electrode 104 including an ion selective membrane (ISM) 106 which includes a polymer that selectively allows certain ions in and keeps other ions out. The working electrode 104 is immersed in a sample solution 108, where a voltage is measured across the two electrodes 102 and 104 by a voltage measurement device 110. Specifically, FIG. 1a is a schematic setup for the laboratory validation experiment: voltage difference between the working electrode 104 (nitrate or pH ISE) and the reference electrode 106 (commercial Ag/AgCl reference) is measured and recorded in the sample solution 110. During the initial (pre-deployment) calibration phase, solution temperature is changed using a heat source 112 and temperature is measured using a commercial thermometer 114. Construction methodologies of these electrodes are described below.

Eq. 5 is expanded from of Eq. 1 and takes into account temperature dependence of $E_0$ and $E_{ref}$. Clearly, from Eq. 5, temperature (T) and calibration parameters (m–$m_{ref}$, C–$C_{ref}$)

of ISE influence its voltage reading and inferred concentration, n. For example, for an Ag/AgCl reference electrode, the value of $m_{ref}$ is between 1-3 mV/° C. and for the working electrode, the value of m is also in this order depending on type of the electrode. It is noteworthy that m and $m_{ref}$ can be positive or negative depending on type of the electrode. Therefore, after including m and $m_{ref}$, Eq. 5 can explain 2-3 mV/° C. temperature sensitivity of ISEs.

In a traditional laboratory setting, a calibration curve is obtained at a fixed calibration temperature which is then used to convert measured voltage V to the analyte concentration n. In other words, with T fixed and the constants $$A \equiv \frac{k_B T}{zq} \text{ and } B \equiv T(m - m_{ref}) + (C - C_{ref}) + \frac{k_B T}{zq}\ln(f(T))$$

pre-calibrated, the measured V(=Aln(n)+B) uniquely defines the analyte concentration n, explaining a high precision obtained in the laboratory setting.

However, if the temperature is not precisely known, as is the case for field-deployed ISEs, the perceived concentration ($n_{Raw}$) deviates significantly from the true concentration (n). Indeed, the error in the measured concentration would increase exponentially with temperature variation ($\Delta T$) and temperature sensitivity of ISE (m–$m_{ref}$) as provided below:

$$n_{raw} = n \times \exp\left(\frac{zq}{k_B}\frac{\Delta T}{T}(m - m_{ref})\right) \tag{6}$$

Thus, temperature correction is an essential pre-requisite for accurate analyte concentration measurement by the ISEs. To increase the accuracy of measurement under varying temperatures, a two-step self-calibration methodology is hereby disclosed, in relationship to FIG. 1a, where each of the ISEs (e.g., one such ISE 104 is shown) that are to be deployed in the field along with a reference electrode (e.g., 102) are calibrated. Specifically, each working ISE electrode is calibrated by placing the electrode in the container with the reference electrode and measurements are made at varying temperatures and known concentrations n. The relationship between voltage across reference electrode and working electrode (V) and temperature is expressed by $$V = \frac{k_B T}{zq}\ln(n) + T(m - m_{ref}) + (C - C_{ref}),$$

where $$\left(\frac{k_B T}{zq}\ln(n) + m - m_{ref}\right)$$

is the slope of a voltage vs. temperature line and (C–$C_{ref}$) is the intercept. In this relationship m–$m_{ref}$ and C–$C_{ref}$ are the only unknowns. At least two measurements are needed to determine values of these unknowns; however, additional datapoints can be curve fit into a line to reduce noise. Therefore, if there are to be n working electrodes used in the field along with one reference electrode, each such working electrode must be calibrated using this process. Once unknowns of each working electrode with respect to one reference electrode is known, then the working electrodes are placed in the field as shown in FIG. 1b, where, e.g., two such working electrodes are placed in a solution along with the reference electrode. Now, since the $m_i$–$m_{ref}$ and $C_i$–$C_{ref}$ of each working electrode is known with respect to a common reference through the above-described calibration process, using Eq. 7, below, the temperature which is otherwise unknown in the field can be calculated. The measured voltage according to FIG. 1b is described as provided below:

$$\Delta V = V_1 - V_2 = T((m_1 - m_{ref}) - (m_2 - m_{ref})) + ((C_1 - C_{ref}) - (C_2 - C_{ref})) \quad (7)$$

where $V_1$ and $V_2$ are measured voltages of the two ISEs with respect to the same reference electrode (RE) with calibration parameters $(m_1 - m_{ref}, C_1 - C_{ref})$ and $(m_2 - m_{ref}, C_2 - C_{ref})$.

It should be noted that from Eq. 5, when determining $\Delta V$, $$\frac{k_B T}{zq} \ln(n)$$

falls out since this term does not change, i.e., since the concentration remains the same and the remainder of this term are all constants. This calculation is accomplished by i) measuring $V_1$ across the first working electrode (ISE$_1$) and the reference electrode (RE), ii) measuring $V_2$ across the second working electrode (ISE$_2$) and the RE, and then measuring $V_{12}$ which is $V_1 - V_2$. In order to reduce noise, pairwise working electrodes can be used to calculate temperatures which can be averaged. In other words, suppose three working electrodes are used (ISE$_1$, ISE$_2$, and ISE$_3$) along with one reference electrode (RE). In this case, $V_1$, $V_2$, and $V_{12}$ are measured/processed to determine $T_1$; then $V_1$, $V_3$, and $V_{13}$ are measured/processed to determine $T_2$; and then $V_2$, $V_3$, and $V_{23}$ is measured/processed to determine $T_3$. The noise-reduced temperature is the average of $T_1$, $T_2$, and $T_3$. Once the temperature is known, the Eq. 5 is used to determine concentration n. Note that in Eq. 5, at this stage in the field, all parameters are known including temperature, except for the concentration n.

Thus, to recap, for the first step, calibration parameters $(m - m_{ref}$ and $C - C_{ref})$ of individual sensors are established from the voltage and temperature relationship of Eq. 5. That is, for a given concentration, n, in the calibration phase, along with known values of T, the value of $m - m_{ref}$ and $C - C_{ref}$ of individual ISEs from coefficients of V vs. T curve (slope and intercept) are initially obtained accounting for $$\frac{k_B T}{zq} \ln(n).$$

Next, Eq. 7, provided above, is used for pre-calibrated field-deployed ISEs in which the only unknown is T. Note that since a difference in voltage (i.e., $V_1 - V_2$) is used in Eq. 7, the unknown term of concentration falls out. Lastly, Eq. 5 is used which at this point has all parameters known except for concentration n. Again, pairwise measurements of a plurality of ISEs can be used to reduce noise of calculate n by making an average of the calculated concentrations.

Eq. 7 denotes that, if the calibration parameters are known, one can obtain the operating temperature from voltage difference of two ISEs (ISE$_1$ and ISE$_2$). These calibration parameters represent parameters associated with "self-temperature" of ISEs since they are calculated from their voltage difference, not from any external thermometer. Note that self-temperature can be determined only if ISEs are characterized by different m values. Fortunately for this application, m differs from sensor to sensor naturally due to process variation. Indeed, an m value of an ISE can be varied in controlled ways by changing thickness or chemical properties of the ion-selective membrane of solid-contact ISEs. The calibration parameters from Eq. 5 and self-temperature from Eq. 7 allow one to finally determine the temperature corrected concentration through Eq. 5.

Figure 1C:
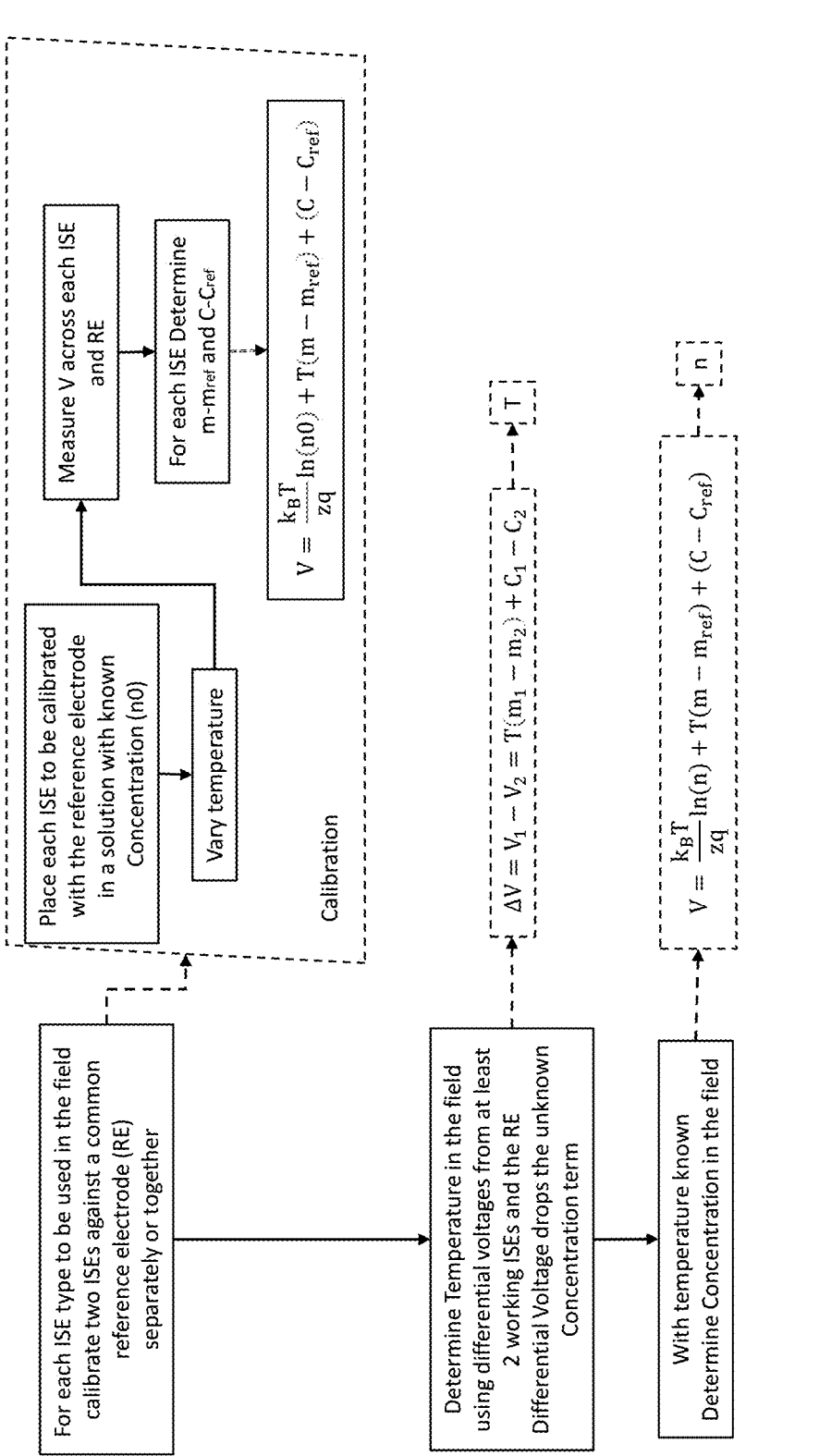

Referring to FIG. 1c, a block diagram is provided that outlines the steps of calibration and use of the ISEs in the field, according to the present disclosure. As fully described above, for each type of ISE to be used in the field (at least two ISEs are needed, according to the present disclosure), two ISEs are placed in a container with known concentration ($n_0$) with a reference electrode (RE), together or separately, and temperature is varied as voltage across each of the two ISEs and RE is measured, thus resulting in a voltage-temperature curve. Using Eq. 5 (without the function term, as that term is approximately 0), the terms $m - m_{ref}$ and $C - C_{ref}$ for each ISE with reference to the RE is determined by measuring the slope $$\left( \frac{k_B}{zq} \ln(n) + m - m_{ref} \right)$$

and the intercept $(C - C_{ref})$ to determine $m - m_{ref}$ and $C - C_{ref}$ for each ISE with respect to the common RE. It should be noted that at this point the only unknowns are $m - m_{ref}$ and $C - C_{ref}$ since both n and T are known in the calibration phase. At this point, $m - m_{ref}$ and $C - C_{ref}$ are known for each of the ISEs. Next, the setup shown in FIG. 1b is used in the field and $\Delta V$ (i.e., $V_1 - V_2$) is measured, where $V_1$ is the voltage across ISE$_1$ and RE and $V_2$ is the voltage across ISE$_2$ and RE, to determine T. Once T is known, Eq. 5 is used again, this time the only unknown is the concentration n.

Figure 1D:
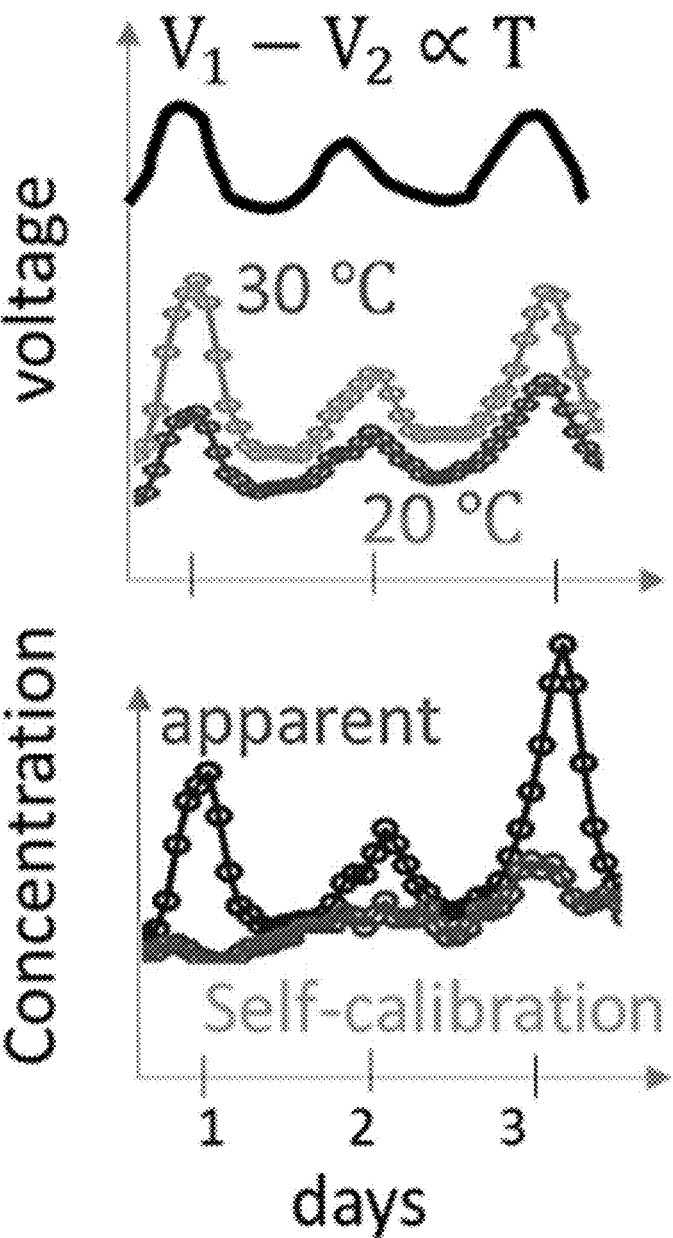

FIG. 1d shows the result of measured differential voltage $(V_1 - V_2)$ which as shown in Eq. 7 is proportional to temperature T. A voltage curve is shown vs. time in days for different temperatures as well as the actual voltage $(V_1 - V_2)$, with clear correlation therebetween. The determined temperature is then used to determine concentration with "apparent" representing a traditional non-self-temperature calibration (used in the prior art) and corrected self-calibrated, according to the present disclosure.

In order to test the above-described strategy of finding parameters associated with self-temperature, various experiments were conducted. Initially, a pH sensing experiment was conducted. A pH sensor was constructed as described. Tridodecylamine (TDDA), high molecular weight poly (vinyl chloride) (PVC), and trioctyl trimellitate (TOTM, ≥99% purity) were purchased from SIGMA ALDRICH™. Reagent-grade tetrahydrofuran (THF) was obtained from FISHER SCIENTIFIC™, and potassium tetrakis (4-chlorophenyl) borate (KTpClPB, ≥98% purity) was obtained from ALFA AESAR™ Conductive carbon paste (DuPont 7102) was screen-printed in the shape of I-bars onto 2-mil Polyethylene Terephthalate (PET) roll film (6 in×100 feet), cured at 120° C. for 7 minutes, then treated with oxygen plasma for 5 minutes at a high setting. A thin layer of exfoliated graphene was spray-coated onto the active area of the electrodes, followed by drop casting of the pH-sensing membrane which was allowed to dry in air over a 24-hour period. The exposed carbon electrodes were passivated with silicone (SS-6002S).

Figure 1E:
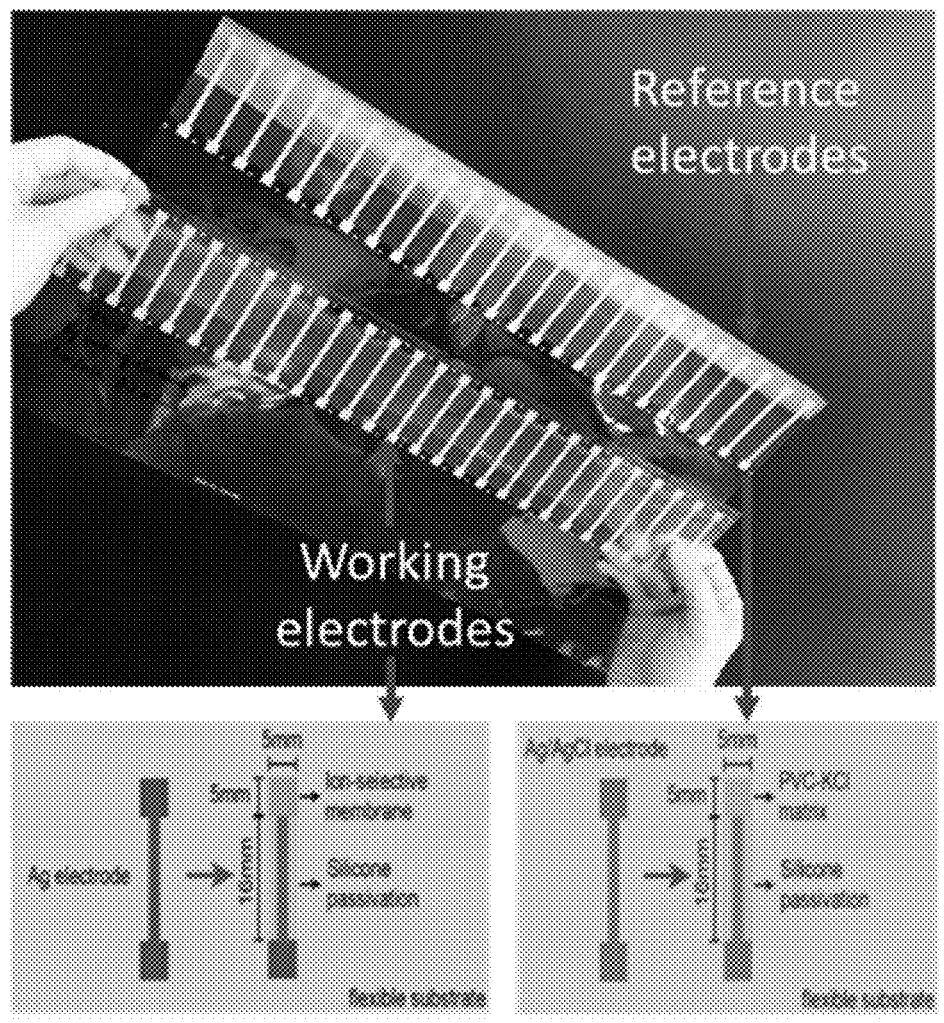

Next, a nitrate sensor was constructed as described. The nitrate sensor was fabricated using a roll-to-roll printing technology through layer-by-layer deposition onto a thin-film flexible substrate as shown in FIG. 1e. Specifically, FIG. 1e is a photograph of a Roll-to-Roll printed nitrate ISE, pH ISE and reference electrodes. A nitrate ion-selective membrane (ISM) layer was coated on the active area of the silver working electrode. The silver electrodes were coated using a Yasui Seiki-MIRWEC Mini-Labo Deluxe coating machine and a similar slot die coating process. In this case, the 0.7-inch-wide die was used to apply an ion selective coating aligned with one end of the electrode array. The material used for this coating comprised a solution of PVC, di-n-butylphthalate, and tetraoctylammonium bromide (TOA-Br) in tetrahydrofuran (THF). The ratio of PVC:di-n-butylphthalate:TOA-Br:THF was 15:30:1:X by weight, where X was between 135 and 160. This suspension was supplied to the slot die at a flow rate of 0.3 to 1.4 mL/min via a tapped hole on one side of the die that was connected to a syringe pump via flexible tubing. After the coating was applied, an inline 1 m long convection oven with air heated to 55° C. flowing on the top and the bottom of the film was used to dry off the solvent.

The reference electrode (RE) was constructed as follows. For laboratory experiments, commercial double-junction Ag/AgCl reference electrode (accumet, FISHER SCIENTIFIC™, filling solution saturated KCl) and for field application, roll-to-roll printed Ag/AgCl reference electrodes (see FIG. 1e) was used. Printed Ag/AgCl electrodes were coated via a continuous, roll-to-roll slot die coating method using the same Yasui Seiki-MIRWEC Mini-Labo Deluxe coating machine. The material used for this coating comprised of potassium chloride particles suspended in a solution of poly (vinyl chloride) (PVC) in tetrahydrofuran (THF). The KCl particles were milled via mortar and pestle and passed through a series of sieves, the finest of which was 635 mesh (20 micrometer opening). The ratio of KCl:PVC:THF was 10:10:100 by weight. After the coating was applied, an in-line 1 m long convection oven with air heated to 55° C. flowing on the top and bottom of the film was used to dry off the solvent.

Before changing the solution temperature, ISEs were conditioned in standard solution until voltages were stabilized and Nernst response was achieved. For the experiment with pH and nitrate sensors, electrodes were submerged into potassium phosphate buffers and standard potassium nitrate solutions, respectively. In order to increase solution temperature, they were placed on a hot plate with magnetic stirring for convection. The temperature was increased in stages from 25° C. to 30° C. in the pH sensor experiment and from 20° C. to 32° C. in the nitrate sensor experiment. Voltage and temperature measurements were carried out simultaneously using a multichannel analyzer (NI USB-6210) and electronic thermometer (Vernier). The schematic setup of the laboratory validation experiment is shown in FIG. 1a.

For field deployment, nitrate ISEs were packaged by placing them within 3D printed containers that are filled with a weather-proof epoxy compound, used as encapsulants. Packaged sensors were interfaced with LoRa boards for wireless communication. Prior to field deployment, ISEs were conditioned in a solution of 0.1 M $KNO_3$ for 10 days until their voltage output is stabilized and Nernst response is achieved. Sensors were placed in 600 mL containers inside water-quality field stations. Water from adjacent fields was collected automatically in a large container and then transferred into the containers where ISEs were placed. Nitrate sensors monitored the nitrate concentration in the sampled water continuously for 6 days. To obtain the ground truth measurements of nitrate concentration periodically, automated colorimetry based on EPA (US Environmental Protection Agency) Method 353.2 was used.

Figure 2B:
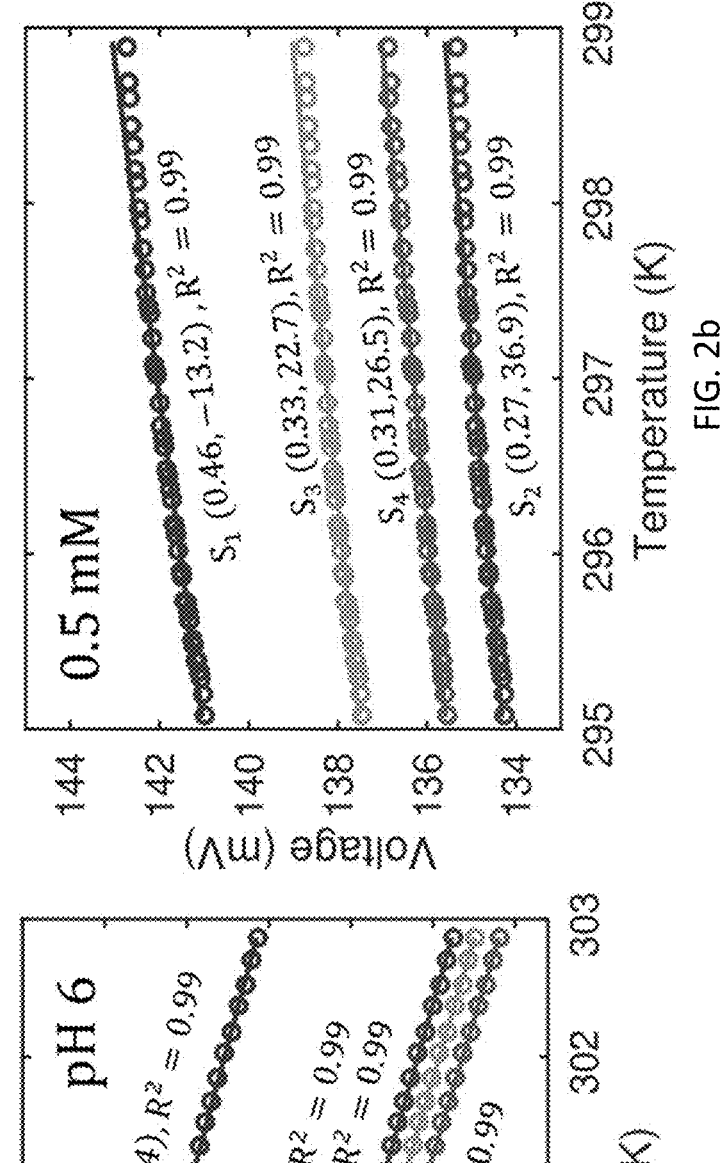
FIGS. 2$a$ and 2$b$ are graphs of voltage in mV and temperature in K relationship for two different types of ISEs: pH and nitrate are provided.
Figure 2A:
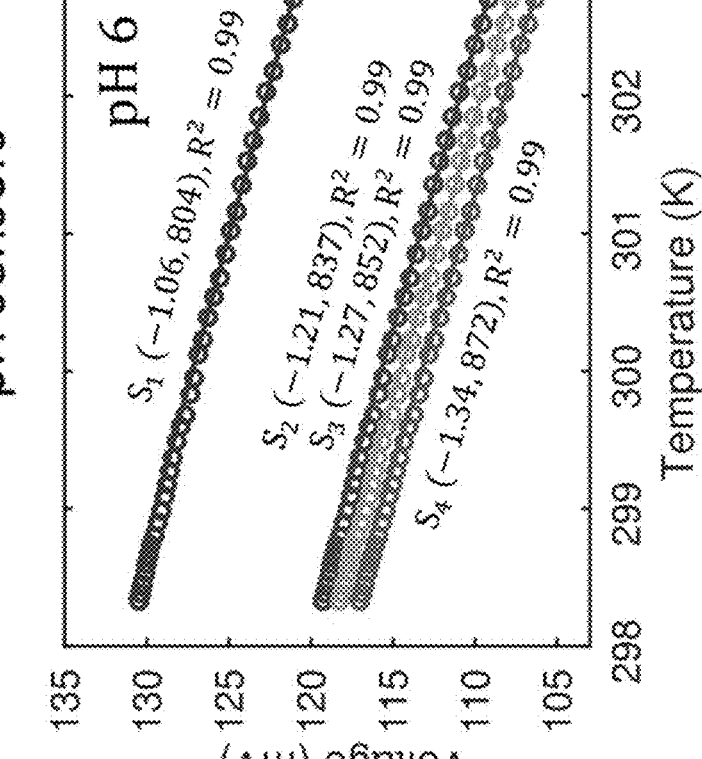

Referring to FIGS. 2a and 2b, graphs of voltage and temperature relationship for two different types of ISEs: pH and nitrate are provided. Specifically, measured voltage vs. temperature are provided for (FIG. 2a) pH sensors in pH6 buffer solution and (FIG. 2b) Nitrate sensors in 0.5 mM $KNO_3$ solution. In particular, voltage and temperature measurements follow linear relationship with fitting coefficient $R^2 = 0.99$, calibration parameters of each ISE are shown in parenthesis—first one is $m - m_{ref}$ in mV/° C. and second one is $C - C_{ref}$ in mV. Voltages are measured with respect to commercial Ag/AgCl reference electrode and solution temperature is measured with external thermometer. FIG. 2a shows measured voltage vs. temperature plot of four pH sensors at pH6 buffer solution which follows a linear correlation with fitting coefficient $R^2 = 0.99$. The temperature sensitivity of the pH sensors i.e., the slope of the lines is $2 \pm 0.1$ mV/° C. According to Eq. 5, the slope and intercept of the line is $$\left( \frac{k_B}{zq} \ln(n) + m - m_{ref} \right)$$

and $(C - C_{ref})$ respectively. FIG. 2a shows the calibration parameters $(m - m_{ref}, C - C_{ref})$ of each ISE calculated from slope and intercept of the fitted line. The values of $m - m_{ref}$ vary from 1.06 mV/° C. to 1.34 mV/° C. for different ISEs. The variation of $m - m_{ref}$ (i.e., m) came from intrinsic variability of fabrication process since the thickness or chemical properties of the sensors were not changed in a controlled way. Nitrate sensors also exhibit linear voltage and temperature relationship at constant 0.5 mM concentration as shown in FIG. 2b. However, temperature sensitivity is relatively low (0.4+0.07 mV/° C.) and calculated $m - m_{ref}$ varies from 0.27 mV/° C. to 0.46 mV/° C. for four nitrate ISEs.

Figures 3A, 3B, 3C:
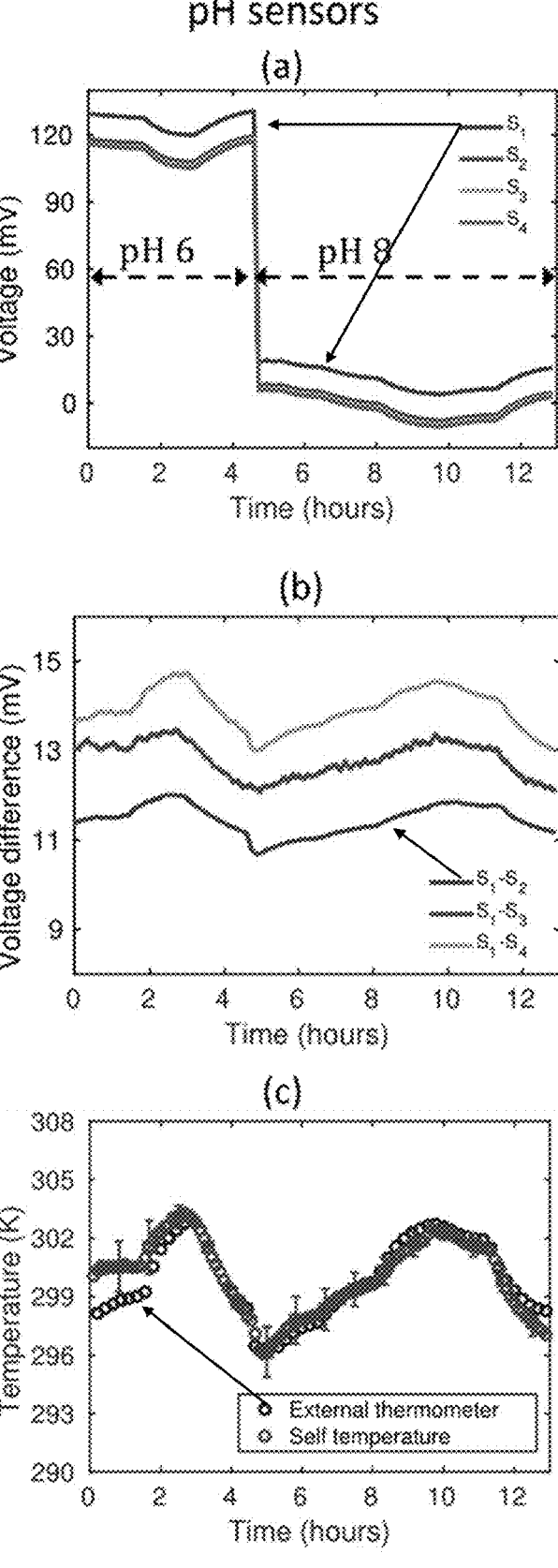
FIGS. 3$a$, 3$b$, and 3$c$ provide graphs of voltage in mV (FIG. 3$a$), voltage difference in mV (FIG. 3$b$), and temperature in K (FIG. 3$c$) vs. time providing measured voltage of pH ISEs with respect to commercial Ag/AgCl reference electrode in sample pH solution.

Having presented the voltage and temperature relationship for two different types of ISEs: pH and nitrate, the self-temperature measurement method described in relationship with Eq. 7 for both pH and nitrate ISEs are now presented. FIG. 3a shows measured voltage of four pH ISEs (same pH sensors that are showed in FIG. 2a) with respect to commercial Ag/AgCl reference electrode in sample pH solution. Specifically, FIG. 3a provides recorded voltage of four pH ISEs at two different pH solutions (pH6 and pH8) while the solution is heated from 25° C. to 30° C. and then cooled down gradually. The solution temperature was increased from 25° C. to 30° ° C. by using a heat source and then cooled down gradually. This experiment was carried out for two different pH solutions-pH 6 and pH8 where the solution pH was changed at 25° C. at time=4.5 hour. When the pH is changed from pH6 to pH8, voltage drops and the amount of drop is ~120 mV which is close to the Nernst response at $$25° \text{ C.} \left( 59 \times \log \frac{10^{-6}}{10^{-8}} = 118 \text{ mV} \right).$$

Although measured voltage depends on solution concentration, Eq. 7 denotes that given different m values, voltage difference of two ISEs placed in the same solution is linearly correlated to solution temperature irrespective of solution concentration. FIG. 3a shows that m–m$_{ref}$ values are different for four pH sensors, thus one can make a pair by taking any two of them whose voltage difference would follow the temperature. For the analysis here, a sensor S$_1$ is fixed and paired with other sensors i.e., S$_2$, S$_3$, S$_4$. FIG. 3b shows voltage differences of three such pairs of pH sensors which confirms that voltage difference does not depend on concentration since the pH of the solution is changed at 4.5 hour. Specifically, FIG. 3b provides pairwise voltage difference of the ISEs. Although voltage of individual sensors depends on concentration, the voltage difference follows the temperature regardless of concentration. From the pairwise voltage difference and previously calculated m–m$_{ref}$, C–C$_{ref}$ values a self-temperature calibration is obtained for each pair of ISEs using Eq. 7. FIG. 3c shows the mean and standard deviation of the self-temperature calibration which closely matches with the external thermometer temperature and average deviation between them is approximately 1° C. Indeed, the self-temperature is more accurate measure of the operating temperature since this temperature is obtained from ISEs' own voltage.

Figure 3D:
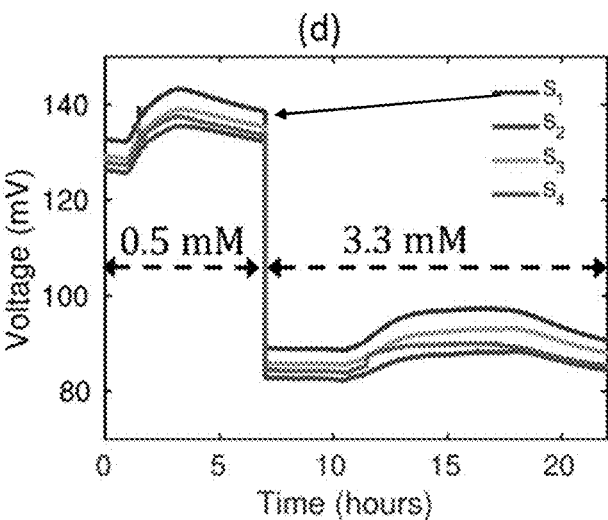
Figure 3E:
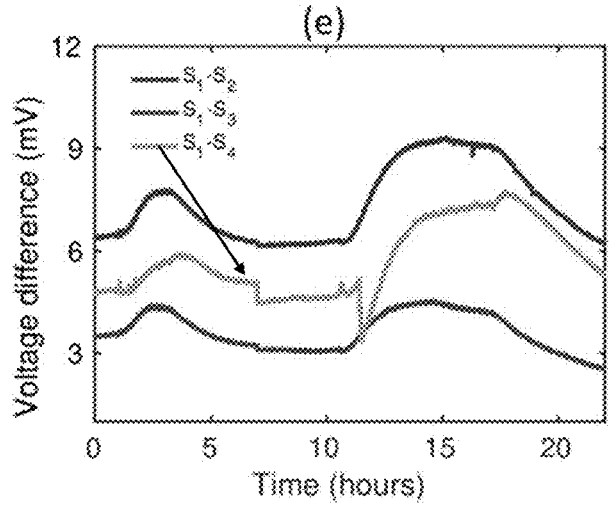
Figure 3F:
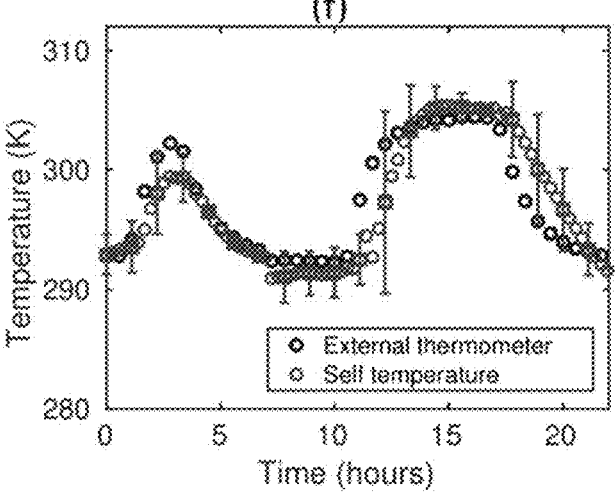

The experiment is repeated for nitrate sensors and the results are summarized in FIGS. 3d-3f. FIG. 3d shows measured voltage of four nitrate ISEs (same sensors that are showed in FIG. 2b). We increase the solution temperature from 20° C. to 32° C. and change the solution concentration from 0.5 mM to 3.3 mM at 20° ° C. after few hours. When we increase the concentration, voltage drops since for nitrate z=−1 and the amount of drop is ~ 50 mV which is close to the Nernst response at $$20° \text{ C.} (58 \times \log \frac{3.3}{0.5} = 48 \text{ mV}).$$

Figure 3G:
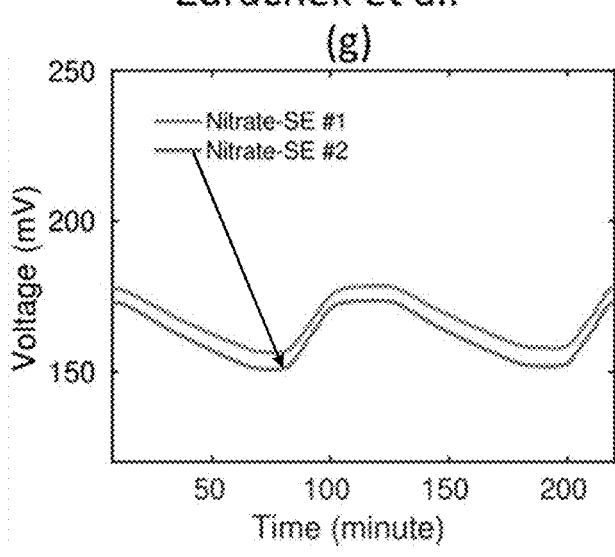
Figure 3H:
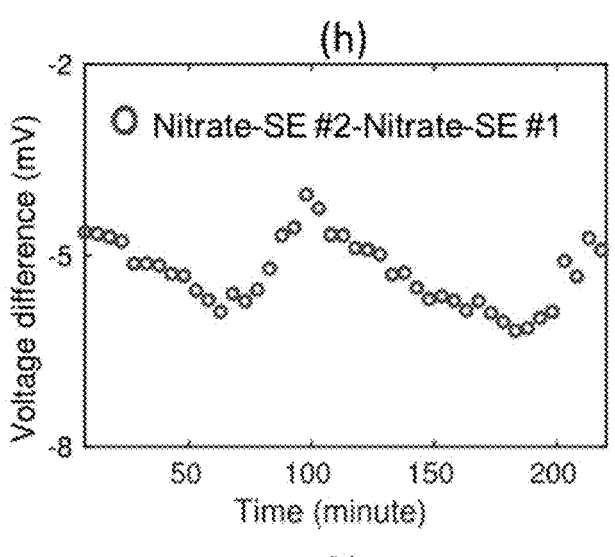
Figure 3I:
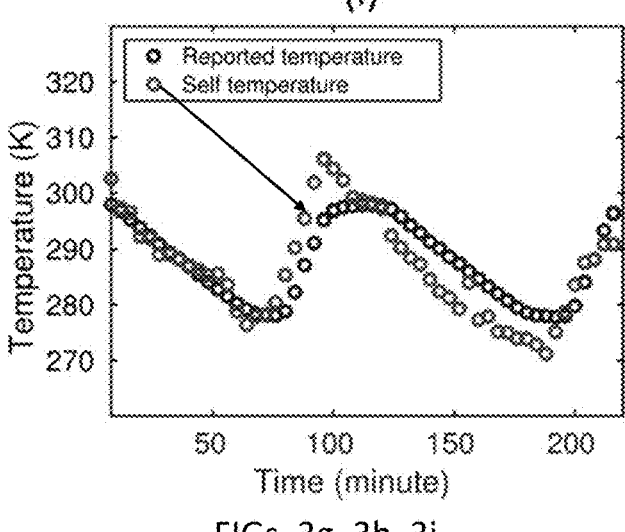

Using the calibration parameters and voltage differences of three pair of sensors shown in FIG. 3e, we calculate the corresponding self-temperatures. Although we change the solution concentration, voltage difference follows the temperature as suggested by Eq. 7. FIG. 3f shows mean and standard deviation of self-temperature along with the temperature measured by external thermometer and average deviation between mean of self-temperature and thermometer temperature is approximately 1° C., as was the case for pH measurement. Similar drift of voltage with temperature variation has been reported by Zdrachek et al. using similar experimental setup (nitrate ISE and Ag/AgCl reference electrode). FIG. 3g shows reported voltage with respect to Ag/AgCl reference electrode in 1 mM nitrate solution while temperature is varied between 5° C.-25° C. To obtain self-temperature we calculate calibration parameters (m–m$_{ref}$, C–C$_{ref}$) using voltage and temperature relation using data of first 60 minutes based on voltage difference between the two ISEs and the reference electrode as shown in FIG. 3h. We found linear voltage and temperature relationship (R$^2$>0.99) in the operating range 5° C.-25° C. FIG. 3i shows calculated self-temperature from differential voltage of two ISEs which reliably represents the reported temperature.

FIGS. 4a-4f show the experimental results of self-temperature corrected concentration of pH and nitrate sensors in self-calibration method that is considered in our laboratory experiment and taken from reference (FIGS. 3a-3i). It is clear from Eq. 5 that even at constant concentration, voltage varies due to the temperature variation. As a result, if we convert voltage to concentration keeping fixed calibration temperature, the calculated Raw concentration does not represent the true solution concentration. FIG. 4a shows Raw pH calculated using Eq. 5 keeping T fixed at 25° C. Raw pH deviates from True pH as we increase the solution temperature from T=25° C. For instance, for only 5° C. change in solution temperature the deviation is about 0.2 pH unit. The deviation is comparable with the theoretical value calculated from Eq. 6 when ΔT=5° C. and T=25° C. is used. Eq. 6 suggests the error will be much higher if temperature variation is stronger (as is typical in the field operating condition) or ISEs are more sensitive to temperature (as have been demonstrated in various types of Nernst sensors). To increase the accuracy of measurement under varying temperature, we compensate for the temperature variation in self-calibration method. In this method, we calculate the temperature corrected concentrations of four pH sensors from Eq. 5, using previously calculated calibration parameters (m–m$_{ref}$, C–C$_{ref}$) and the mean of self-temperature. FIG. 4a shows the temperature corrected (T-corrected) pH in comparison with True and Raw pHs. The figure shows T-corrected pH closely follows the True pH and the deviation of measurement is 0.07 pH unit as opposed to 0.2 pH unit without temperature correction. Therefore, the self-calibration method improves the accuracy of pH measurements by 3 times for only 5° C. variation in solution temperature. FIG. 4b shows the absolute error of Raw pH relative to True pH which is 2.0±1.0% for pH6 and 1.6±0.8% for pH8. For T-corrected pH, the error is reduced to 0.3±0.4% and 0.3±0.1% for pH6 and pH8 respectively.

FIG. 4c shows Raw and T-corrected nitrate concentration when solution temperature is varied from 20° C. to 32° ° C. Here, Raw concentration is calculated using Eq. 5 keeping T fixed at 20° C. Clearly, compared to Raw concentration, T-corrected concentration matches well with True concentration, therefore self-calibration significantly reduces the measurement error. We can calculate relative error between True and Raw concentration using Eq. 6 which is about 15%, for ΔT=12° C., T=20° C., and measured m–m$_{ref}$ values showed in FIG. 2b. FIG. 4d shows that the absolute error of Raw concentration relative to True concentration is 12±5% for 0.5 mM and 13±6% for 3.3 mM nitrate concentration. Whereas self-calibration method (on an average) can reduce the error of T-corrected concentration to 5% of the True value. FIGS. 4e-4f show self-calibration results of nitrate ISEs shown in FIG. 3g. Using the calibration parameters and self-temperature we calculate T-corrected concentration that corrects most of the measured concentration drift due to temperature variation thereby yields 3× improvement in measurement accuracy compared to Raw concentration. To reduce the drift due to temperature variation, a symmetric setup has been proposed in this work where Ag/AgCl reference electrode is replaced by an identical nitrate ISE immersed into a solution with constant background of nitrate ion. Even in that setup, self-calibration method further reduces the variation of measured concentration due to temperature to 1% of True value.

Figure 5A:
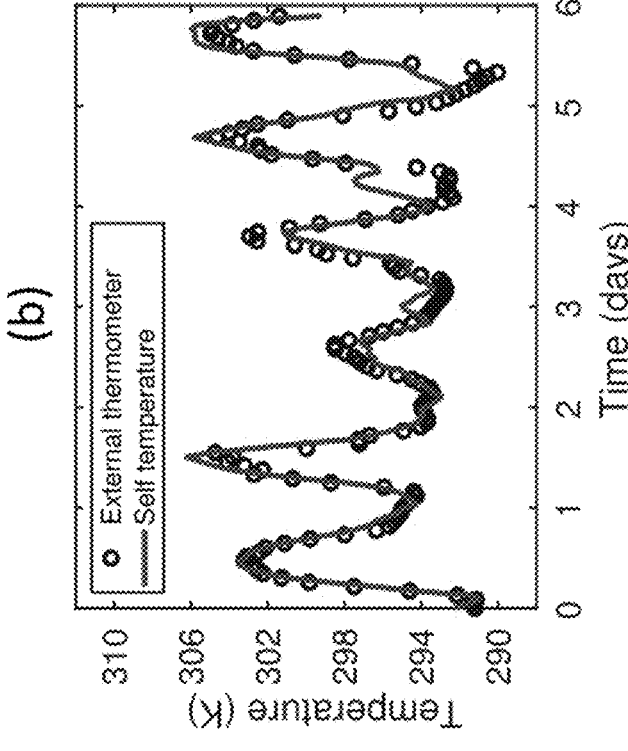
FIGS. 5$a$ and 5$b$ provide graphs of voltage in mV, and temperature in K, respectively, vs. time in days which show voltage change associated with temperature changes of ISE associated with days and nights.

The self-calibration system and method described herein are applied in field study to measure nitrate concentration of agricultural field under natural temperature variation. For that we deploy two nitrate ISEs in the watershed of an agricultural field and monitor nitrate concentration of the water solution washed away from the field continuously for 6 days. Since the solution and the ISEs are placed in an open place, solution temperature varies as environmental temperature varies between day and night. We measure the voltage of nitrate ISEs with respect to printed Ag/AgCl reference electrodes as well as the environmental temperature with an external thermometer. FIG. 5a shows measured voltage changes by ~80 mV which corresponds to more than an order of magnitude (apparent) variation in nitrate concentration between day and night. This variation must come from temperature variation since nitrate concentration of the field solution does not change so fast. Therefore, compensation for temperature variation is necessary to obtain true nitrate concentration from the oscillating voltage.

Figure 5B:
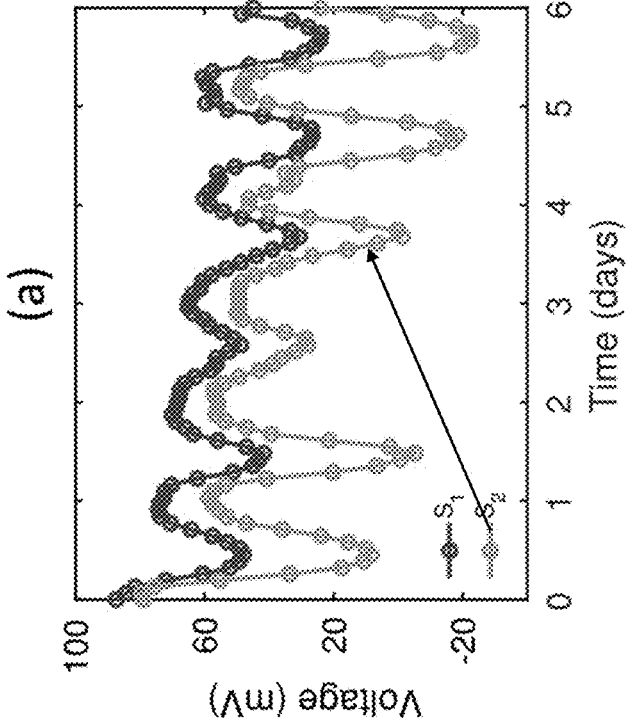

To measure and compensate for temperature variation, the sensors were calibrated using voltage and temperature data of first half day. In the calibration process we calculate $m-m_{ref}$, $C-C_{ref}$ values of each sensor as described earlier. We found $m-m_{ref}$, $C-C_{ref}$ values for $S_1(S_2)$ to be $-3.2$ mV/° C. ($-6.1$ mV/° C.) and 988 mV (1800 mV) respectively. The obtained $m-m_{ref}$ values therefore temperature sensitivity of the field deployed nitrate sensors are much higher than the sensors used in experiment in the laboratory condition (see FIG. 2b). The discrepancy is because the laboratory experiments were done in standard $KNO_3$ solution whereas field study was done with field water that contains other interfering ions and biological matters. As a result, physical and chemical properties of working and reference electrodes may change relatively quickly in field water which may increase the temperature sensitivity. Using the $m-m_{ref}$, $C-C_{ref}$ values of $S_1$ and $S_2$, we obtain self-temperature of the ISEs from their voltage difference according to Eq. 7. FIG. 5b shows the self-temperature and external thermometer temperature and the average deviation between them is 1.7° C. Therefore, self-temperature can be a substitution of external thermometer in practical applications.

Figure 5C:
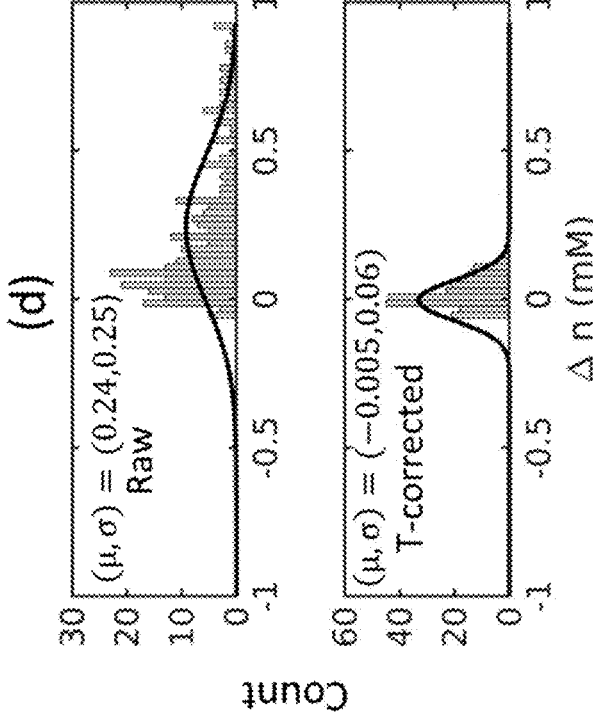
Figure 5D:
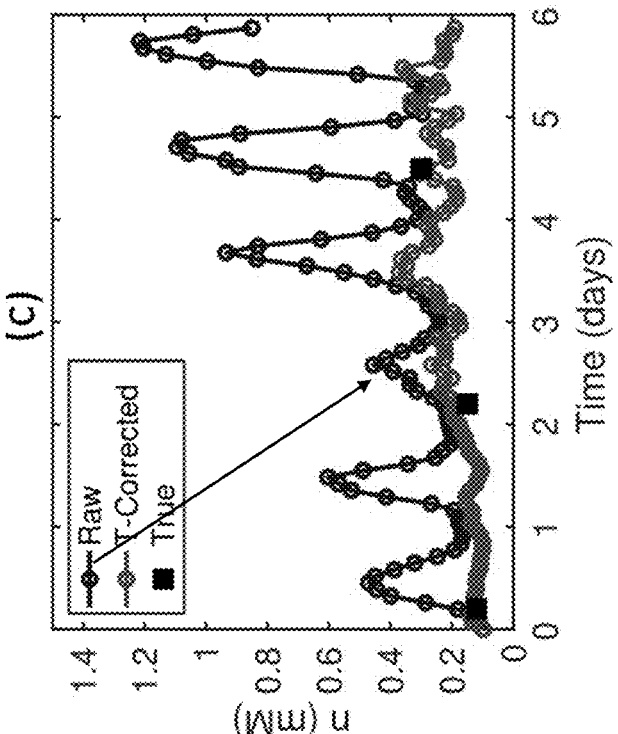

Finally, we calculate the temperature corrected nitrate concentration (T-corrected) of field water, using the calculated self-temperature in Eq. 5 as shown in FIG. 5c. We compare it with Raw concentration that is calculated by assuming a fixed temperature 20° C. throughout the field experiment. For ground truth measurement, we collect water sample at day 1, 3 and 5 and measure the nitrate concentration of the collected sample in the laboratory using high precision commercial nitrate sensor which is widely used by agronomists to measure the nitrate concentration of agricultural field. FIG. 5c shows that, although Raw concentration varies by more than an order of magnitude with the variation of temperature, T-corrected concentration does not show any temperature dependence. We can also validate it from the histograms of Raw and T-corrected concentrations in FIG. 5d. Since we measure the ground truth at discrete times, if we assume nitrate concentration changes monotonically in between, we can interpolate the true concentration in intermediate times. In FIG. 5d, we show the error between calculated concentration (Raw, T-corrected) and interpolated true concentration in the histogram. For T-corrected concentration the error is Gaussian and so it is a statistical noise, independent of temperature. For continuous monitoring systems, we can reduce the error due to statistical noise by averaging the continuous data points for a period of time. In the field study, we take the voltage readings in 30 minutes interval. If nitrate concentration changes slower than this frequency, we can average the readings of a time period which will reduce the average error due to statistical noise. FIG. 5d shows that self-calibration method reduces average error of T-corrected concentration to 0.005 mM which is within 4% of true nitrate concentration.

Figure 6:
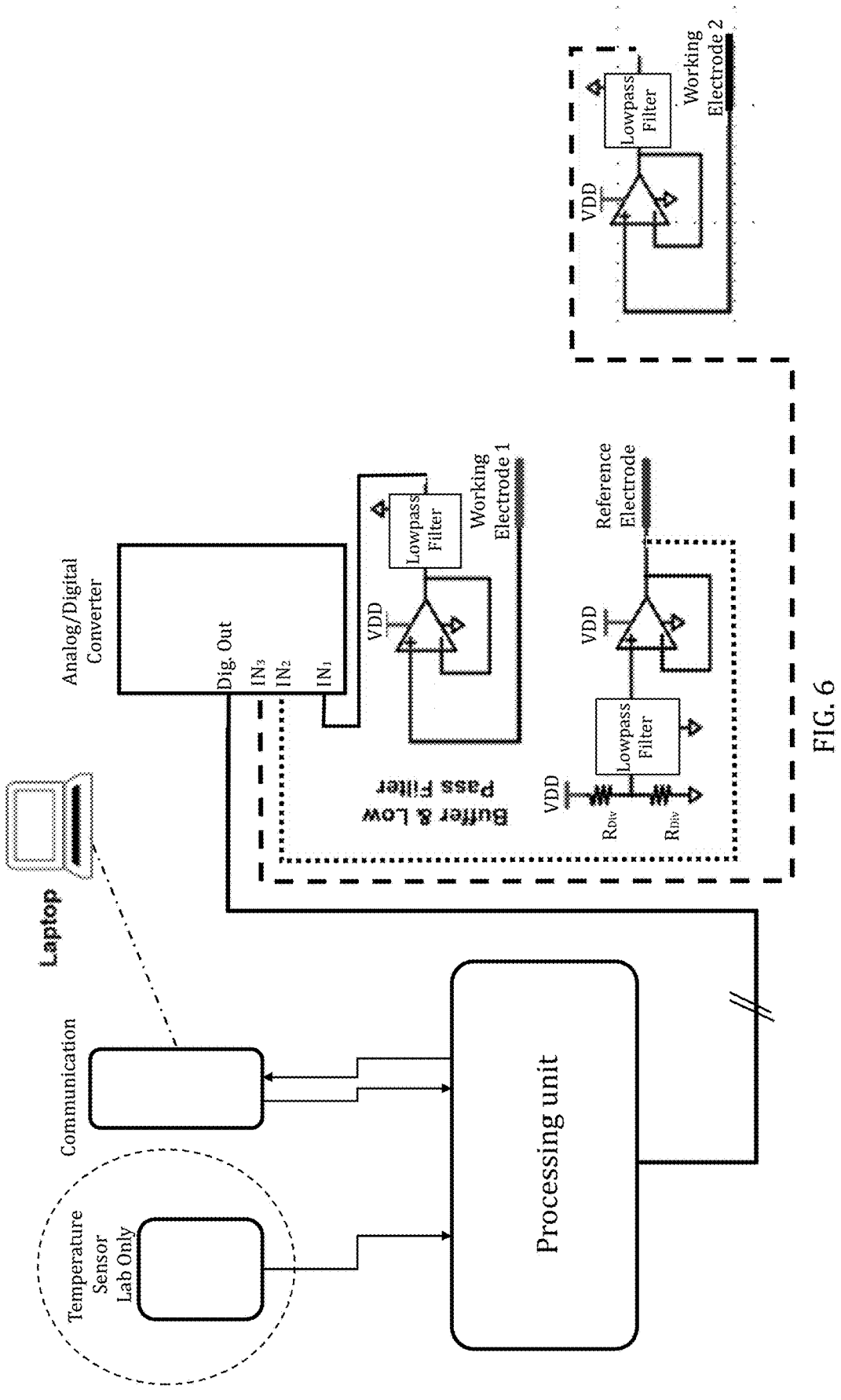
FIG. 6 is a sample schematic as to how to operate and obtain data from the reference and working electrodes, according to the present disclosure.

With reference to FIG. 6, a sample schematic is shown as to how to operate and obtain data from the reference and working electrodes. The example shown in FIG. 6 is provide for the PH electrodes but can be used for other types. As shown in FIG. 6, a temperature sensing arrangement (temperature sensor) is coupled to a processing unit (e.g., a microcontroller) which may be adapted to accept data in form of an analog or digital signal. A communication unit, e.g., a Bluetooth block is coupled to the processing unit and is adapted to provide communication (wired or wireless) between the processing unit and an external computer (e.g., a laptop). An analog to digital converter (ADC) block is also coupled to the processing unit (e.g., in cases where the processing unit does not have its own analog inputs) and is adapted to first convert analog inputs to digital numbers and provide the digital numbers over a digital bus (discrete parallel bus, e.g., 8 bit bus, or a serial digital bus) to the processing unit. Three analog inputs are coupled to the two working electrodes and the reference electrode. The working electrodes each are coupled to a buffer (an operational amplifier with a unity gain feedback) whose output is filtered using a lowpass filter, while the reference electrode is coupled to an operational amplifier with an AC ground established by a voltage divider. The outputs of these three amplifiers are provided to the ADC as inputs which converts each input and provides the digital converted representation of each input on the digital out.

It should be appreciated that while FIG. 6 shows discrete components, e.g., a processing unit, a communication unit, an ADC, operational amplifiers, these discrete components can be integrated into an application specific integrated circuit, as known to a person having ordinary skill in the art.

It should also be noted that the processing unit shown in FIG. 6 operates software held in a non-transitory memory to thereby process digital information from the ADC and communicate that to the computer (laptop).

It should be further noted that although the present disclosure describes a field-deployed temperature self-calibrating method and system, including wearable sensors, nothing in this disclosure is intended to exclude laboratory-based measurement as well. Specifically, most laboratories do not use temperature sensing in their reaction beakers and pipettes, but instead assume that the ambient temperature is the temperature of the solution within such reaction beakers and pipettes. In particular, having multiple temperature sensing elements may be cumbersome or even impractical due to size of a vessel, e.g., a pipette may not be sufficiently large to accommodate placement of the temperature sensing element. Additionally, in an exothermic reaction, an assumption that the solution temperature is the same as ambient temperature is without merit. The approach provided in the present disclosure eliminates reliance on this assumption and overcomes the aforementioned limitations.

Those having ordinary skill in the art will recognize that numerous modifications can be made to the specific implementations described above. The implementations should not be limited to the particular limitations described. Other implementations may be possible.

The invention claimed is:

1. A system of temperature self-calibrating ion-selective electrodes (ISEs) for determining one or more field parameters, comprising:

at least two ISEs and a reference electrode (RE);

one electronic buffer coupled to each of the at least two ISEs and adapted to generate a voltage associated with each of the at least two ISEs and with respect to voltage of the RE;

an analog to digital converter (ADC) coupled to each of the electronic buffers and configured to convert analog signals to digital signals;

a processing unit executing software held in a non-transitory memory and coupled to the ADC and configured to receive the digital signals from the ADC and further configured to:

calibrate the at least two ISEs and the RE, wherein the calibration includes placement of the at least two ISEs in a calibration solution with a predetermined concentration of target ions as a temperature of the calibration solution varies according to a known schedule, wherein the calibration of the at least two ISEs includes determining calibration parameters of each of the at least two ISEs with respect to the RE;

determine the one or more field parameters by:

placement of the at least two calibrated ISEs and the RE into a field solution;

determine voltage across a first ISE of the at least two calibrated ISEs and the RE ($V_{Fi}$);

determine voltage across a second ISE of the at least two calibrated ISEs and the RE ($V_{F(i+1)}$); and determine difference of $V_{Fi}$ and $V_{F(i+1)}$; to thereby determine the one or more field parameters, wherein the calibration of the at least two ISEs by the processing unit includes:

measure voltage across each of the at least two ISEs and the RE after placing each of the at least two ISEs with the RE separately or together in the calibration solution;

establish at least two predetermined temperatures for the calibration solution;

curve fit the measured voltage against temperature into a linear function; and determine slope and intercept of the linear function to thereby establish the calibration parameters of each of the at least two ISEs with respect to the RE, wherein the calibration parameters of each of the at least two ISEs with respect to the RE include $m_i-m_{ref}$ and $C_i-C_{ref}$, wherein $m_i$ and $C_i$ are parameters that depend on physical and chemical properties of the at least two ISEs, and $m_{ref}$ and $C_{ref}$ are parameters that depend on physical and chemical properties of the RE, and wherein the slope and the intercept of the linear function is determined based on $$V=(k_B/z_c q \ln(n_c)+m_i-m_{ref})T_c+(C_i-C_{ref}),$$

where $k_B$ is the Boltzmann's constant with a value of $1.3807\times10^{-23}$ joules per kelvin, q is the elementary charge with a value of $1.60217663\times10^{-19}$ coulombs, $T_c$ is the temperature of the calibration solution in Kelvin according to the known schedule, $Z_c$ is a charge number of the calibration solution, and $n_c$ is the predetermined concentration of target ions in the calibration solution in moles per volume, where the slope of the linear function represents ($k_B/z_c q \ln(n_c)+m_i-m_{ref}$) as a quantity to be determined for each of the at least two ISEs, the intercept of the linear function represents ($C_i-C_{ref}$) as a quantity to be determined for each of the at least two ISEs, and i represents an index associated with the at least two ISEs.

2. The system of claim 1, wherein the one or more field parameters includes the temperature of the field solution.

3. The system of claim 1, wherein the at least two ISEs are a plurality of ISEs and $m_i-m_{ref}$ and $C_i-C_{ref}$ are determined in pairwise manner amongst the plurality of ISEs, where the index i represents each ISE of the plurality of ISEs.

4. The system of claim 1, wherein the one or more field parameters includes the concentration of target ions in the field solution ($n_F$) after determining the temperature of the field solution ($T_F$).

5. The system of claim 1, wherein the at least two ISEs are of pH and nitrate types.

6. A system of temperature self-calibrating ion-selective electrodes (ISEs) for determining one or more field parameters, comprising:

at least two ISEs and a reference electrode (RE);

one electronic buffer coupled to each of the at least two ISEs and adapted to generate a voltage associated with each of the at least two ISEs and with respect to voltage of the RE;

an analog to digital converter (ADC) coupled to each of the electronic buffers and configured to convert analog signals to digital signals;

a processing unit executing software held in a non-transitory memory and coupled to the ADC and configured to receive the digital signals from the ADC and further configured to:

calibrate the at least two ISEs and the RE, wherein the calibration includes placement of the at least two ISEs in a calibration solution with a predetermined concentration of target ions as a temperature of the calibration solution varies according to a known schedule, wherein the calibration of the at least two ISEs includes determining calibration parameters of each of the at least two ISEs with respect to the RE;

determine the one or more field parameters by:

placement of the at least two calibrated ISEs and the RE into a field solution;

determine voltage across a first ISE of the at least two calibrated ISEs and the RE ($V_{Fi}$);

determine voltage across a second ISE of the at least two calibrated ISEs and the RE ($V_{F(i+1)}$); and determine difference of $V_{Fi}$ and $V_{F(i+1)}$; and to thereby determine the one or more field parameters, wherein the calibration of the at least two ISEs by the processing unit includes:

measure voltage across each of the at least two ISEs and the RE after placing each of the at least two ISEs with the RE separately or together in the calibration solution;

establish at least two predetermined temperatures for the calibration solution;

curve fit the measured voltage against temperature into a linear function; and determine slope and intercept of the linear function to thereby establish the calibration parameters of each of the at least two ISEs with respect to the RE, wherein the calibration parameters of each of the at least two ISEs with respect to the RE include $m_i-m_{ref}$ and $C_i-C_{ref}$, wherein $m_i$ and $C_i$ are parameters that depend on physical and chemical properties of the at least two ISEs, and $m_{ref}$ and $C_{ref}$ are parameters that depend on physical and chemical properties of the RE, wherein the one or more field parameters includes concentration of target ions in the field solution ($n_F$) after determining temperature of the field solution ($T_F$), and wherein the concentration of target ions in the field solution is determined by $$n_F = e^{\left(\left(V_{Fi}-\left(C_i-C_{ref}\right)-T_F\left(m_i-m_{ref}\right)\right)\frac{z_Fq}{k_BT_F}\right)},$$

where an index i represents a corresponding ISE of the at least two ISEs, and $V_{Fi}$ represents the voltage across said $i^{th}$ ISE and the RE, $k_B$ is the Boltzmann's constant with a value of $1.3807 \times 10^{-23}$ joules per kelvin, q is the elementary charge with a value of $1.60217663 \times 10^{-19}$ coulombs, $T_F$ is the temperature of the field solution in Kelvin, and $z_F$ is a charge number the field solution.

7. The system of claim 6, wherein the slope and the intercept of the linear function during calibration is determined based on $$V_i = \left(\frac{k_B}{z_C q}\ln(n_C) + m_i - m_{ref}\right)\cdot T_C + (C_i - C_{ref}),$$

where the slope of the linear function represents $$\left(\frac{k_B}{z_C q}\ln(n_C) + m_i - m_{ref}\right)$$

as a quantity to be determined for each ISE of the at least two ISEs, the intercept of the linear function represents $(C_i - C_{ref})$ as a quantity to be determined for each of the at least two ISEs, and i represents an index associated with each ISE of the at least two ISEs, where $T_C$ is the temperature of the calibration solution in Kelvin according to the known schedule, $z_c$ is a charge number of the calibration solution, and $n_c$ is the predetermined concentration of target ions in the calibration solution.

8. The system of claim 7, wherein the one or more field parameters includes the temperature of the field solution $(T_F)$.

9. The system of claim 8, wherein the temperature of the field solution $(T_F)$ for each combination of the at least two ISEs and the RE is determined based on $$T_F = ((V_{Fi} - V_{F(i+1)}) - (C_i - C_{ref} - (C_{i+1} - C_{ref})))/(m_i - m_{ref} - (m_{i+1} + m_{ref})),$$

where indexes i and i+1 represent the associated ISEs of the at least two ISEs.

10. The system of claim 9, wherein the at least two ISEs are a plurality of ISEs and $m_i - m_{ref}$ and $C_i - C_{ref}$ are determined in pairwise manner amongst the plurality of ISEs, where the index i represents each ISE of the plurality of ISEs.

11. The system of claim 6, wherein the at least two ISEs are of pH and nitrate types.

* * * * *